United States Patent
Neubauer et al.

(10) Patent No.: US 9,726,296 B2
(45) Date of Patent: Aug. 8, 2017

(54) PRESSURE REDUCING VALVE WITH SEPARATE RADIAL BORES FOR DIFFERENT FLUID FLOW PATHS

(71) Applicant: Robert Bosch GmbH, Stuttgart (DE)

(72) Inventors: Ralf Neubauer, Lohr (DE); Klaus Habr, Marktheidenfeld (DE); Valentin Voth, Bruchkoebel (DE); Thomas Mueller, Steinfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/869,510

(22) Filed: Sep. 29, 2015

(65) Prior Publication Data

US 2016/0091101 A1 Mar. 31, 2016

(30) Foreign Application Priority Data

Sep. 29, 2014 (DE) .................. 10 2014 219 634

(51) Int. Cl.
  *F16K 11/065* (2006.01)
  *F16K 31/40* (2006.01)
  (Continued)

(52) U.S. Cl.
  CPC ...... *F16K 11/0655* (2013.01); *F16K 11/0716* (2013.01); *F16K 27/044* (2013.01);
  (Continued)

(58) Field of Classification Search
  CPC ....... Y10T 137/7766; Y10T 137/86694; Y10T 137/86702; Y10T 137/8671;
  (Continued)

(56) References Cited

U.S. PATENT DOCUMENTS 4,243,062 A * 1/1981 Shelton ................. E03B 7/12
                                                  137/491
2008/0035225 A1   2/2008 Tackes et al.
(Continued)

FOREIGN PATENT DOCUMENTS

DE   10 2009 006 445 B3   7/2010
DE   10 2012 002 191 A1   8/2013
(Continued)

OTHER PUBLICATIONS

RD 18111-02/06.05; 3-Wege-Druckreduzierventil, vorgesteuert; Bosch Rexroth AG, Lohr am Main, Germany; dated Jun. 1, 2005 (German language document) (8 pages).
(Continued)

*Primary Examiner* — William McCalister
(74) *Attorney, Agent, or Firm* — Maginot, Moore & Beck LLP

(57) ABSTRACT

A hydraulic cartridge valve includes a sleeve with a longitudinal bore that forms a working port via an end opening. A plunger is accommodated for linear motion in the longitudinal bore. The sleeve is penetrated in an inlet port region by a first radial bore that extends radially with respect to a longitudinal axis of the hydraulic cartridge valve. The sleeve is penetrated in a return port region by a second radial bore that extends radially with respect to the longitudinal axis. A first fluid flow path extends from the inlet port to the working port and a second fluid flow path extends from the working port to the return port. The plunger has third and fourth radial bores that extend radially with respect to the longitudinal axis and form part of the first and second fluid flow paths, respectively.

8 Claims, 2 Drawing Sheets

(51) Int. Cl.
*F16K 11/07* (2006.01)
*F16K 27/04* (2006.01)
*F16K 31/12* (2006.01)

(52) U.S. Cl.
CPC ............ F16K 31/12 (2013.01); F16K 31/406 (2013.01); *Y10T 137/7766* (2015.04); *Y10T 137/86702* (2015.04)

(58) Field of Classification Search
CPC ............ F16K 11/0655; F16K 11/0716; F16K 27/044; F16K 31/12; F16K 31/406
USPC ................... 137/491, 625.67, 625.68, 625.69
See application file for complete search history.

(56) References Cited

U.S. PATENT DOCUMENTS

| 2012/0012773 | A1 | 1/2012 | Fischer | |
| 2014/0116551 | A1* | 5/2014 | Smith | F16K 11/0716 137/625.69 |

FOREIGN PATENT DOCUMENTS

| GB | 2499808 A | 9/2013 |
| WO | 2014/066592 A1 | 5/2014 |

OTHER PUBLICATIONS

RE 18111-02/06.05; 3-way pressure reducing valve, pilot operated; Bosch Rexroth AG, Lohr am Main, Germany; dated Jun. 1, 2005 (English language equivalent of RD 18111-02/06.05) (8 pages).

\* cited by examiner

PRESSURE REDUCING VALVE WITH SEPARATE RADIAL BORES FOR DIFFERENT FLUID FLOW PATHS

This application claims priority under 35 U.S.C. §119 to patent application no. DE 10 2014 219 634.5, filed on Sep. 29, 2014 in Germany, the disclosure of which is incorporated herein by reference in its entirety.

BACKGROUND

The disclosure relates to a cartridge valve.

A hydraulic cartridge valve in the form of a 3-way pressure reducing valve is known from the catalog which was available for download on Aug. 7, 2014 at the following Internet address: http://www.boschrexroth.com/RDSearch/rd/r_18111-02/rd18111-02_2005-06.pdf. This cartridge valve has a sleeve, which is provided for installation in a matching location hole in a larger subassembly. The sleeve has a first longitudinal bore, which extends along a longitudinal axis. An end opening of the first longitudinal bore forms a working port of the cartridge valve. A plunger is accommodated for linear motion in the first longitudinal bore. In the region of an inlet port, the sleeve is penetrated by a plurality of first radial bores extending radially with respect to the longitudinal axis. In the region of a return port, the sleeve is penetrated by a plurality of second radial bores extending radially with respect to the longitudinal axis. The first and the second radial bores are arranged at a distance from one another in the direction of the longitudinal axis. A first fluid flow path is furthermore provided, which extends from the inlet port to the working port, wherein a second fluid flow path extends from the working port to the return port. The plunger is designed in such a way that the first and/or the second fluid flow path is/are blocked, depending on the position of said plunger, while they are otherwise open.

By means of the known cartridge valve, the pressure at the working port is adjusted to a predetermined value by passing pressurized fluid either from the inlet port to the working port via the first fluid flow path or from the working port to the return port via the second fluid flow path. To control the pressure, use is made particularly of the fact that the pressure at the working port loads the plunger in the direction of the longitudinal axis.

It is the object of the disclosure to increase the maximum possible through flow, particularly in the case of flow along the first fluid flow path.

SUMMARY

The plunger has at least one third radial bore, which extends radially with respect to the longitudinal axis, wherein it is part of the first fluid flow path, wherein the plunger has at least one fourth radial bore, which extends radially with respect to the longitudinal axis, wherein it is part of the second fluid flow path, wherein it is arranged at a distance from the at least one third radial bore in the direction of the longitudinal axis. Different radial bores are thus available in the plunger for the first and the second fluid flow path, and these bores can each be matched specifically to the associated flow conditions. Consequently, the maximum possible through flow is increased. The cartridge valve is preferably designed to adjust the pressure at the working port to a predetermined value by adjustment of the plunger.

Advantageous developments and improvements of the disclosure are indicated in the dependent claims.

At least one first land, which is annular with respect to the longitudinal axis, is arranged on the outside of the sleeve, between the at least one first radial bore and the at least one second radial bore with respect to the longitudinal axis. By means of the at least one first land, the inlet and return ports are separated from one another. Two separate first lands are preferably provided, between which is arranged a first sealing ring, which can be brought into sealing contact with the location hole.

A second land, which is annular with respect to the longitudinal axis is arranged either on the outside of the plunger or on the inside of the first longitudinal bore, is provided between the at least one third radial bore and the at least one fourth radial bore with respect to the longitudinal axis, wherein said land rests sealingly against the respective other part, the sleeve or the plunger. By means of the second land, the first and the second fluid flow path are separated from one another. Pressurized fluid flowing along the first fluid flow path therefore flows exclusively via the at least one third radial bore. Pressurized fluid flowing along the second fluid flow path flows exclusively via the at least one fourth radial bore.

The plunger has a second longitudinal bore, which extends along the longitudinal axis, wherein said bore is open towards the working port, wherein the at least one third and the at least one fourth radial bore open into the second longitudinal bore, wherein the second longitudinal bore is part of the first and the second fluid flow path. As a result, it is possible to provide a connection between the working port and the third and fourth radial bores in an economical manner involving little flow resistance.

A preloaded spring is provided, which rests against the plunger in such a way that it is loaded for a movement towards the working port. By means of the spring, the plunger is moved into a first end position if there are no fluid forces acting thereon. The first fluid flow path is preferably open in the first end position, whereas the second fluid flow path is closed in the first end position.

The plunger has a stop surface, which is aligned perpendicularly to the longitudinal axis, wherein it faces in the direction of the working port, wherein the sleeve has an associated counterstop surface, which rests against the stop surface in a first end position of the plunger. The stop surface and the counterstop surface define the location of the first end position of the plunger, which is set by the spring discussed above.

A first control edge is provided, which is annular with respect to the longitudinal axis and is arranged either on the outside of the plunger or on the inside of the first longitudinal bore, wherein the first control edge is part of the first fluid flow path. The first control edge preferably forms an orifice either together with the at least one third or the at least one first radial bore, the free cross-sectional area of said orifice changing in accordance with the position of the plunger. Accordingly, the first fluid flow path can be either opened or blocked by movement of the plunger.

A second control edge is provided, which is annular with respect to the longitudinal axis and is arranged either on the outside of the plunger or on the inside of the first longitudinal bore, wherein the second control edge is part of the second fluid flow path. The first control edge preferably forms an orifice either together with the at least one fourth or the at least one second radial bore, the free cross-sectional area of said orifice changing in accordance with the position of the plunger. Accordingly, the second fluid flow path can be either opened or blocked by movement of the plunger. The first and the second control edge are preferably arranged at a distance from one another in the direction of the longitudinal axis. The first and the second control edge are preferably arranged on the same part and most preferably on the same part as the second land.

The working port is connected to the return port via a restrictor and an adjustable pilot valve, wherein an actuating pressure between the restrictor and the pilot valve loads the plunger in the direction of the working port. By means of the pilot valve, it is possible to set the setpoint pressure to which the pressure at the working point is adjusted. During the control process, the plunger moves into a location in which the pressure force which the pressure exerts on the plunger at the working port is equal to the pressure force which the actuating pressure exerts on the plunger. Here, the actuating pressure can be varied by adjusting the pilot valve. For this purpose, an actuating device which has a solenoid is preferably used.

The plunger has a third longitudinal bore extending along the longitudinal axis on the side facing away from the second longitudinal bore, wherein the second and the third longitudinal bore are connected to one another via the restrictor. It is thereby ensured that the actuating pressure acts on the plunger in the desired direction. The restrictor is preferably arranged between the second and the third longitudinal bore in the plunger.

It is self-evident that the features mentioned above and those which remain to be explained below can be used not only in the respectively indicated combination but also in other combinations or in isolation without exceeding the scope of the present disclosure.

BRIEF DESCRIPTION OF THE DRAWINGS

The disclosure is explained in greater detail below with reference to the attached drawings, in which.

DETAILED DESCRIPTION

Figure 1:
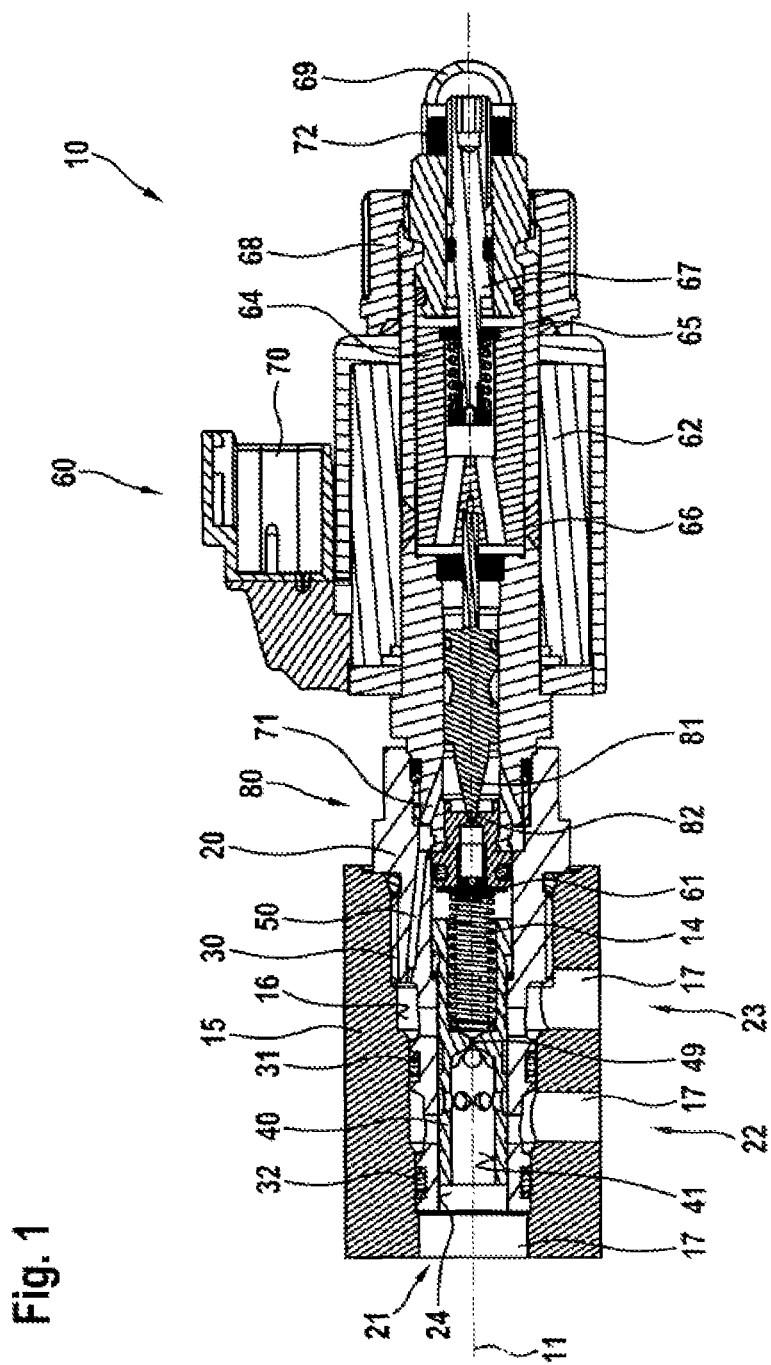
FIG. 1 shows a longitudinal section through a hydraulic cartridge valve according to the disclosure.

FIG. 1 shows a longitudinal section through a hydraulic cartridge valve 10 according to the disclosure. The cartridge valve 10 is built into a larger subassembly 15, which can be a hydraulic valve block, for example. The larger subassembly 15 has a location hole 16, which is in the form of a stepped hole extending along a longitudinal axis 11.

The sleeve 20 of the cartridge valve 10 is built into a location hole 16, and is screwed firmly and leaktightly to the latter by means of the fastening thread 30. Provided on the outside of the sleeve 20 are a working port 21; an inlet port 22 and a return port 23, which are each associated with one fluid passage 17 in the larger subassembly 15. The inlet and return ports 22; 23 are separated leaktightly from one another by means of the first sealing ring 31. The working port 21 and the inlet port 22 are separated fluidtightly from one another by means of the second sealing ring 32.

On the inside, the sleeve 20 has a first longitudinal bore 24, which is of circular-cylindrical design with respect to the longitudinal axis 11. The end opening of the first longitudinal bore 24 forms the first working port 21. A plunger 40 is accommodated for linear motion in the direction of the longitudinal axis 11 in the first longitudinal bore 24. The plunger 40 is pushed in the direction of the working port 21 by a preloaded spring 14, which is embodied as a helical spring. On the side remote from the plunger 40, the spring 14 is supported on a spring plate 61 which, in turn, rests against a valve seat 82, which is accommodated immovably in the sleeve 40.

Together with the associated valve cone 81, the valve seat 82 forms a pilot valve 80. The free cross-sectional area of this seat valve can be adjusted continuously by means of an actuating device 60. The valve cone 81 is guided in the pole tube 65 of the actuating device 60 in a manner which allows linear motion in the direction of the longitudinal axis 11. Overall, this thus gives a fluid flow path which leads from the working port 21 via a restrictor 49 in the plunger 40, via a longitudinal bore in the spring plate 61, via the valve seat 82 and onwards via the first connecting passage 71 in the pole tube 65 and the second connecting passage 50 in the sleeve 20 to the return port 23. In this arrangement, it is possible, by adjusting the pilot valve 80 to set an actuating pressure in the space in which the spring 14 is situated which loads the plunger 40 in the direction of the working port 21.

A magnet armature 64 is accommodated in the pole tube 65 of the actuating device 60 in a manner which allows movement in the direction of the longitudinal axis 11. The magnet armature 64 preferably consists of a ferromagnetic material, such as soft iron, and can therefore be magnetized by means of the solenoid 62. The magnet armature 64 is coupled to the valve cone 81 for motion in the direction of the longitudinal axis 11. In this case, the magnet armature 64 and the valve cone 81 are moved to the right in FIG. 1 by the pressure acting from the direction of the working port 21, causing the pilot valve 80 to open. This force is counteracted by the magnetic force which the solenoid 62 exhibits on the magnet armature 64. In this context, attention should be drawn to the flux interruption portion 66 in the pole tube 65, the location of which affects the direction of said magnetic force. The flux interruption portion can be non-magnetizable material, such as copper, while the remainder of the pole tube consists of ferromagnetic material. However, it is also possible for a pole tube which is entirely ferromagnetic to have a very small wall thickness in the flux interruption portion 66, enabling the flux interruption portion to be brought to saturation by the solenoid 62.

The solenoid 62 is supplied with power via the connection socket 70. An adjustable end stop 67, by means of which the maximum opening cross section of the pilot valve 80 can be set, is furthermore provided for the magnet armature 64. The corresponding adjusting screw projects from the pole tube 65 and is protected from damage by the removable protective cap 69. The setting of the end stop 67 is secured by means of a lock nut 72. A retention screw 68, by means of which the solenoid 62 is held on the pole tube 65, is furthermore screwed onto the pole tube 65.

Figure 2:
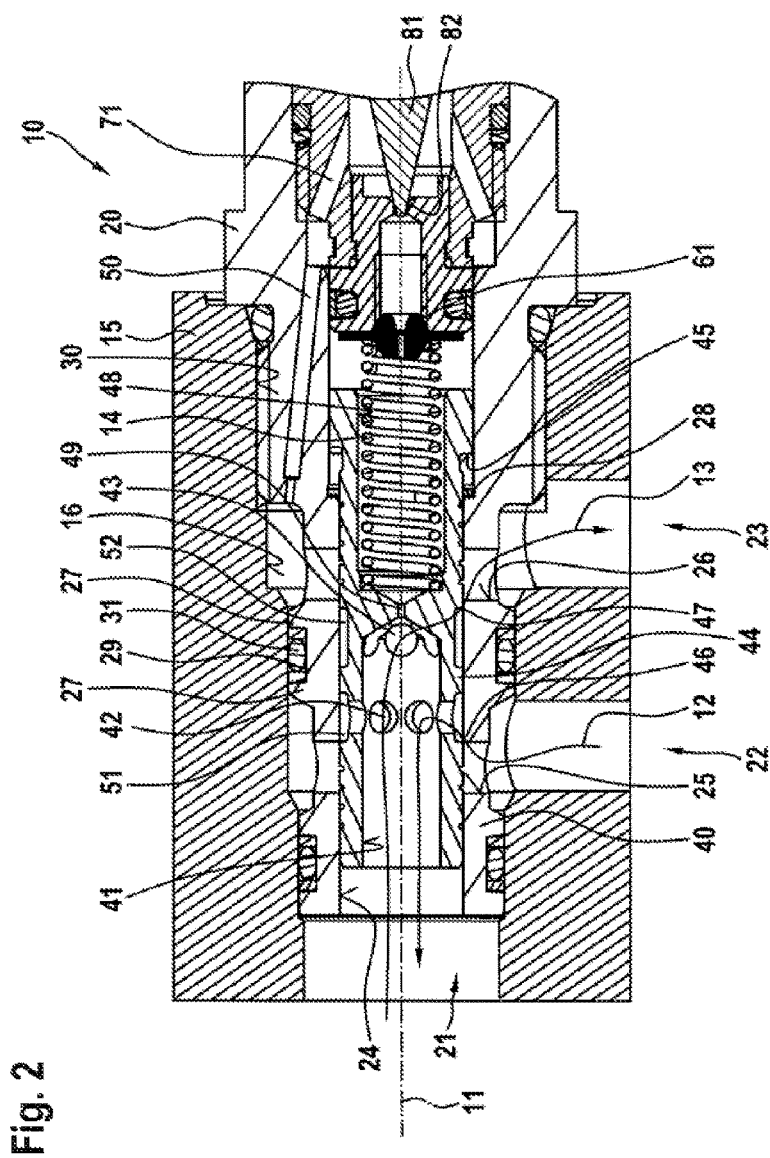
FIG. 2 shows an enlarged detail of FIG. 1 in the region of the plunger.

FIG. 2 shows an enlarged detail of FIG. 1 in the region of the plunger 40. The plunger 40 has a second and a third longitudinal bore 41; 48, which are arranged at opposite longitudinal ends of the plunger 40. The second and the third longitudinal bore 41; 48 are of circular-cylindrical design with respect to the longitudinal axis 11 and have approximately the same diameter. The restrictor 49 discussed above is arranged in the plunger 40 between the second and the third longitudinal bore 41; 48, allowing pressurized fluid to flow from the working port 21 to the valve seat 82 via the second longitudinal bore 41, the restrictor 49 and the third longitudinal bore 48. The diameter of the restrictor 49 is made so small that a pressure drop is produced across the restrictor, it being possible to control said pressure drop through the setting of the pilot valve 80. The pressure in the third longitudinal bore 48 is the actuating pressure discussed above, which loads the plunger 40 in the direction of the working port 21. Spring 14 is furthermore accommodated in the third longitudinal bore 48 and is therefore guided laterally.

A plurality of third radial bores 42 and a plurality of fourth radial bores 43 are provided on the plunger 40 in the region of the second longitudinal bore 41. The third and the fourth radial bores 42; 43 are each arranged in a manner uniformly distributed over the circumference of the plunger 40, being arranged at a distance from one another in the direction of the longitudinal axis 11. Here, the third radial bores 42 are arranged closer to the working port 21 than the fourth radial bores 43. The third and the fourth radial bores 42; 43 are each assigned a groove 51; 52, which runs around in a ring shape on the outside of the plunger 40. In this arrangement, the two grooves 51; 52 jointly delimit a second land 44 on the plunger 40, which is arranged between the third and the fourth radial bores 42; 43, resting sealingly on the first longitudinal bore 24. The second land 44 separates the first and the second fluid flow path 12; 13 from one another.

The first fluid flow path 12 extends from the inlet port 22 via a plurality of first radial bores 25 in the sleeve 20, via groove 51, via the third radial bores 42 in the plunger 40 and via the second longitudinal bore 41 to the working port 21. The second fluid flow path 13 extends from the working port 21, via the second longitudinal bore 41, via the fourth radial bores 43 in the plunger 40, via groove 52 and via the second radial bores 26 in the sleeve 20 to the return port 23. Here, the first and the second radial bores 25; 26 are arranged in a manner uniformly distributed over the circumference of the sleeve 20.

On the opposite side from the second land 44, groove 51 forms a first control edge 46, which runs around the plunger 40 in a ring shape. Together with the first radial bores 25, the first control edge 46 delimits an adjustable orifice, the free cross-sectional area of which varies continuously when the plunger 40 is moved. It becomes larger when the plunger is moved towards the working port 21. On the opposite side from the second land 44, groove 52 forms a second control edge 47, which runs around the plunger 40 in a ring shape. Together with the second radial bores 26, the second control edge 47 delimits an adjustable orifice, the free cross-sectional area of which varies continuously when the plunger 40 is moved. It becomes larger when the plunger 40 is moved away from the working port 21. Here, the cartridge valve 10 is designed in such a way that either the first or the second fluid flow path 12; 13 is opened, while, in the central position illustrated in FIG. 2, both fluid flow paths 12; 13 are blocked.

Attention should furthermore be drawn to the two first lands 27, which are arranged on the outside of the sleeve 20, running around the sleeve 20 in a ring shape. The first lands 27 together delimit a seal groove 29, in which a first sealing ring 31 is accommodated, said ring separating the inlet port 22 and the return port 23 fluidtightly from one another.

Attention should furthermore be drawn to the stop surface 45, which is arranged on the side of the plunger 40 remote from the working port 21. The stop surface 45 is aligned perpendicularly to the longitudinal axis 11 and faces the working port 21. Arranged on the sleeve 20 is a matching counterstop surface 28, which touches stop surface 45 when the plunger 40 is in the first end position, in which it is at the shortest distance from the working port 21. In the opposite, second end position, the plunger 40 rests against the spring plate 61.

In the unpressurized state of the cartridge valve 10, the plunger 40 is pushed into the first end position by spring 14, with the result that the first fluid flow path 12 is open and the second fluid flow path 13 is blocked. Thus, pressurized fluid can flow from the inlet port 22 to the working port 21. As a result, the pressure typically rises at the working port 21 and, as a consequence, the valve cone 81 is raised from the valve seat 82. During this process, the force of the actuating device (No. 60 in FIG. 1) must be overcome. The result is a fluid flow from the working port 21 to the return port 23, which causes a pressure drop across the restrictor 49. This has the effect that the plunger 40 moves away from the working port 21. As a result, the first fluid flow path 12 closes, while the second fluid flow path 13 is opened.

Accordingly, pressurized fluid can flow from the working port 21 to the return port 23, causing the pressure at the working port 21 to fall. As a result, the actuating pressure in the third longitudinal bore 48 also falls. When the latter is no longer sufficient to keep the pilot valve 80 open, the pressure drop across the restrictor 49 disappears and the plunger 40 moves towards the working port 21. Thus, the first fluid flow path 12 opens again, while the second fluid flow path 13 closes. The result is that the pressure at the working port 21 is adjusted precisely to the pressure required to keep the pilot valve 80 in a slightly open position, counter to the actuating force of the actuating device.

LIST OF REFERENCE SIGNS 10 cartridge valve
11 longitudinal axis
12 first fluid flow path
13 second fluid flow path
14 spring
15 larger subassembly
16 location hole
17 fluid passage
20 sleeve
21 working port
22 inlet port
23 return port
24 first longitudinal bore
25 first radial bore
26 second radial bore
27 first land
28 counterstop surface
29 seal groove
30 fastening thread
31 first sealing ring
32 second sealing ring
40 plunger
41 second longitudinal bore
42 third radial bore
43 fourth radial bore
44 second land
45 stop surface
46 first control edge
47 second control edge
48 third longitudinal bore
49 restrictor
50 second connecting passage
51 encircling groove
52 encircling groove
60 actuating device
61 spring plate with longitudinal bore
62 solenoid
64 magnet armature
65 pole tube
66 flux interruption portion
67 adjustable end stop 68 retention screw for solenoid
69 protective cap for the end stop
70 connection socket
71 first connecting passage
72 lock nut
80 pilot valve
81 valve cone
82 valve seat

What is claimed is:

1. A hydraulic cartridge valve, comprising:
a sleeve having a first longitudinal bore that extends along a longitudinal axis, the first longitudinal bore configured to form a working port via an end opening;
a plunger accommodated for linear motion in the first longitudinal bore;
at least one first radial bore penetrating the sleeve in the region of an inlet port and extending radially with respect to the longitudinal axis;
at least one second radial bore penetrating the sleeve in the region of a return port, the at least one second radial bore extending radially with respect to the longitudinal axis and being arranged at a distance from the at least one first radial bore in the direction of the longitudinal axis;
a first fluid flow path extending from the inlet port to the working port;
a second fluid flow path extending from the working port to the return port, and
a third fluid flow path extending from the working port via a restrictor and an adjustable pilot valve to the return port,
wherein the plunger is configured such that one or more of the first fluid flow path and the second fluid flow path are blocked, depending on the position of the plunger, while the one or more of the first fluid flow path and the second fluid flow path are otherwise open,
wherein the plunger has at least one third radial bore that extends radially with respect to the longitudinal axis and forms part of the first fluid flow path,
wherein the plunger has at least one fourth radial bore that (i) extends radially with respect to the longitudinal axis, (ii) forms part of the second fluid flow path, and (iii) is arranged at a distance from the at least one third radial bore in the direction of the longitudinal axis,
wherein the plunger has a second longitudinal bore that extends along the longitudinal axis, wherein the second longitudinal bore is open towards the working port, wherein the at least one third and fourth radial bores open into the second longitudinal bore, and wherein the second longitudinal bore forms part of the first, second, and third fluid flow paths, and
wherein the plunger has a third longitudinal bore extending along the longitudinal axis on the side facing away from the second longitudinal bore, wherein the second and third longitudinal bores are connected to one another via the restrictor, and wherein an actuating pressure between the restrictor and the pilot valve loads the plunger in the direction of the working port.

2. The hydraulic cartridge valve according to claim 1, wherein at least one first land, which is annular with respect to the longitudinal axis, is arranged on the outside of the sleeve, between the at least one first radial bore and the at least one second radial bore with respect to the longitudinal axis.

3. The hydraulic cartridge valve according to claim 1, wherein a second land, which is annular with respect to the longitudinal axis and is arranged either on the outside of the plunger or on the inside of the first longitudinal bore, is disposed between the at least one third radial bore and the at least one fourth radial bore with respect to the longitudinal axis, and wherein the second land rests sealingly against the respective other part, the sleeve, or the plunger.

4. The hydraulic cartridge valve according to claim 1, further comprising a preloaded spring that rests against the plunger in such a way that the plunger is loaded by the spring for a movement towards the working port.

5. The hydraulic cartridge valve according to claim 1, wherein the plunger has a stop surface that is aligned perpendicularly to the longitudinal axis and faces in the direction of the working port, and wherein the sleeve has an associated counterstop surface that rests against the stop surface in a first end position of the plunger.

6. The hydraulic cartridge valve according to claim 1, further comprising a first control edge, which is annular with respect to the longitudinal axis and is arranged either on the outside of the plunger or on the inside of the first longitudinal bore, wherein the first control edge forms part of the first fluid flow path.

7. The hydraulic cartridge valve according to claim 1, further comprising a second control edge, which is annular with respect to the longitudinal axis and is arranged either on the outside of the plunger or on the inside of the first longitudinal bore, wherein the second control edge forms part of the second fluid flow path.

8. The hydraulic cartridge valve according to claim 3, wherein the second land is delimited by a first groove and a second groove in the plunger, the first groove aligned with the at least one third radial bore of the plunger and the second groove aligned with the at least one fourth radial bore of the plunger.

* * * * *